Patented Sept. 6, 1949

2,480,971

UNITED STATES PATENT OFFICE 2,480,971

SENSITIZATION OF HYDROGEN BROMIDE CATALYZED OXIDATION REACTIONS

Frederick F. Rust, John H. Raley, and William E. Vaughan, Berkeley, Calif., assignors to Shell Development Company, San Francisco, Calif., a corporation of Delaware No Drawing. Original application January 17, 1944, Serial No. 518,664. Divided and this application March 28, 1947, Serial No. 738,018

7 Claims. (Cl. 260—514)

This invention relates to the controlled non-explosive oxidation of organic compounds containing one or more replaceable hydrogen atoms. In one of its more specific embodiments it pertains to an improved process for effecting the catalytic oxidation of such organic compounds to produce high yields of carboxylic acids, alcohols, ketones and/or organic peroxides having either the same or twice the number of carbon atoms per molecule as the primary starting material treated.

This application is a division of our copending patent application Serial No. 518,664, filed January 17, 1944, which has now issued as U. S. Patent No. 2,421,392.

It has been previously discovered that carboxylic acids, ketones and/or organic peroxides may be produced by subjecting organic compounds having at least one replaceable hydrogen atom to a partial and controlled oxidation in the presence of hydrogen bromide which latter catalyzes and controls the reaction. More specifically stated, it has been discovered that the above-mentioned and hereinbelow more fully described organic compounds may be subjected to a controlled, non-explosive oxidation in the presence of a catalyst consisting of hydrogen bromide to produce high yields of desirable carboxylic acids, organic peroxides and/or ketones containing at least the same number of carbon atoms per molecule as the starting organic material thus subjected to the oxidation. For instance, U. S. Patent No. 2,452,326, filed January 30, 1943, discloses and claims a process for the controlled, partial and non-explosive oxidation of aliphatic and particularly saturated aliphatic hydrocarbons and of their products of partial halogenation, to produce carboxylic acids and/or ketones having the same number of carbon atoms per molecule as the starting material treated. In accordance with the process disclosed and claimed in said application, this oxidation is effected by subjecting the saturated organic materials, such as ethane, propane and butane, as well as their products of halo-substitution, to the action of oxygen at an elevated temperature which is, however, below that at which spontaneous combustion occurs, this oxidation being effected in the presence of a catalyst comprising or consisting of hydrogen bromide. Also, U. S. Patent No. 2,415,500, filed March 12, 1945, covers a process for the controlled, non-explosive oxidation of aromatic hydrocarbons and particularly of alkylated aromatic hydrocarbons to produce phenol, substituted phenols, aromatic carboxylic acids, organic peroxides, and/or ketones having the same number of carbon atoms per molecule as the starting material, this oxidation being effected by subjecting the mentioned aryl or aralkyl hydrocarbons or their partially halogenated derivatives to the action of oxygen at an elevated temperature which is preferably above about 100° C., but below the temperature capable of causing spontaneous combustion, and in the presence of hydrogen bromide employed as the catalyst. U. S. Patent 2,360,181, discloses and claims and a similar process for the production of predetermined oxygenated products by the controlled catalytic oxidation, under non-explosive conditions, of alicyclic hydrocarbons and of their halogenated derivatives, while U. S. Patent 2,395,523, covers a process for the production of novel organic peroxides and organic hydroperoxides by the controlled oxidation of isoparaffins such as isobutane. Similarly, U. S. Patent 2,369,182, is directed to the production of certain unsaturated carboxylic acids and/or ketones by the controlled hydrogen bromide catalyzed oxidation, under non-explosive conditions, of unsaturated organic compounds such as unsaturated aliphatic hydrocarbons, while U. S. Patent 2,373,240 covers a process for the production of unsubstituted and halo-substituted unsaturated carboxylic acids by the controlled oxidation of halogenated unsaturated hydrocarbons. In all of these cases the controlled oxidation is effected in the presence of a catalyst consisting of or comprising hydrogen bromide which, as stated, may be introduced as such into the reaction zone or formed in situ under the operating conditions employed.

The above-outlined inventions are predicated on the discovery that the presence of hydrogen bromide during the catalytic oxidation of the above-mentioned and hereinbelow more fully described organic compounds controls the oxidation reaction so that the oxidation occurs on the carbon atom or atoms to which a halogen atom, such as a bromine atom, would normally attach itself if the starting material were subjected to a halo-substitution reaction. Also, it appears that the presence of the hydrogen bromide, besides retarding the explosion or complete combustion of the organic starting material, has the effect of inhibiting the decomposition of the carbon structure of the starting organic material so that the resultant oxygenated compound or compounds contain the same number of carbon atoms per molecule as the starting organic material or, as in the case of certain organic peroxides such as those formed during the controlled catalytic oxidation of isoparaffins, contain twice the number of carbon atoms per molecule present in the starting material treated.

It has now been discovered that the catalytic non-explosive oxidation of organic compounds, and particularly of the group of organic compounds described more fully hereinbelow, may be realized more effectively by subjecting these organic starting materials under the defined temperature and pressure conditions to the action of oxygen in the presence of hydrogen bromide and of relatively small amounts of certain substances which apparently act as sensitizers. As will be pointed out hereinbelow and particularly in the examples, the use of these substances during the catalytic oxidation of the organic materials in the presence of hydrogen bromide greatly increases the yield of the desired oxygenated products, reduces the concentration of the hydrogen bromide necessary for effecting the desired reaction, and increases the rate of conversion even in the cases where the reaction is effected at temperatures considerably below those necessary for the similar controlled catalytic oxidations, which are effected in the absence of these sensitizing materials. Additionally, the presence of the sensitizers permits the effecting of the hydrogen bromide catalyzed oxidation reactions at temperatures at which explosions would normally occur but for the presence of these sensitizing materials. Still another advantage of the present process resides in the fact that economical yields of the desired oxygenated products may be obtained with hydrogen bromide concentrations materially below those necessary when no sensitizer is employed, this decrease in the hydrogen bromide concentration being considerably greater than the amount of sensitizer necessary for such lowering of the hydrogen bromide concentration. The use of the hereinabove mentioned and hereinbelow more fully described class of sensitizers also permits the controlled oxidation at temperatures which are insufficient to effect the production of the desired oxygenated products during controlled oxidations when no sensitizer is used. Also the addition of the sensitizer greatly increases the yield of the desired products, this increase being considerably greater than that obtainable by an equivalent increase in the hydrogen bromide concentration.

The present process is applicable to the oxidation of all organic compounds which contain at least one replaceable hydrogen atom, the process being effective for the controlled oxidation of aliphatic hydrocarbons, particularly saturated aliphatic hydrocarbons, as well as of aromatic hydrocarbons, alkylated aromatic hydrocarbons, alicyclic hydrocarbons, which may or may not contain one or more saturated or unsaturated aliphatic side-chains, as well as of their derivatives such as the products of their partial halo-substitution. Also, various other organic derivatives, e. g. nitriles, ketones, etc. fall within the class of organic compounds that may be employed as the starting material. For example, methyl ethyl ketone may be readily oxidized according to the present process to produce diacetyl. A particularly suitable class of organic compounds that may be subjected to the hydrogen bromide catalyzed controlled oxidation in the presence of the sensitizers of the present invention comprise the straight-chain organic compounds, particularly straight-chain paraffins, as well as other organic compounds the oxidation of which is difficult and thus ordinarily requires comparatively rigorous conditions. Cyclohexane is a typical example of such organic compounds. Another group includes compounds of the type of ethyl benzene which, when oxidized in accordance with the process of the present invention, produces acetophenone. As pointed out above, the use of the sensitizers permits the oxidation with hydrogen bromide concentrations and temperatures considerably lower than those essential for the controlled oxidation in the absence of sensitizers. Such treatment decreases the undesirable side reactions of the type of ketone condensation reactions.

Representative organic compounds of the class that may be oxidized in accordance with the process of the invention include the straight-chain and branched-chain saturated aliphatic hydrocarbons such as ethane, propane, butanes, pentanes, hexanes, heptanes, octanes and the like; the alicyclic hydrocarbons such as cyclobutane, cyclopentane, cyclohexane, and higher homologues thereof; and the alkylated cycloparaffins such as methyl cyclopentane, methyl cyclohexane, and the like; aryl and aralkyl hydrocarbons such as naphthalene, toluene, xylenes, ethyl benzene, n-propyl benzene, butylbenzenes, and the like; the partially halo-substituted derivatives of the above-mentioned and similar hydrocarbons such as ethyl chloride, dichlorethane, dibrompropanes, monochlorbutanes, monobrombutanes, dichlorbutanes, monochlorcyclopentane, benzyl chloride, benzyl bromide, and their homologues and analogues. Also, the corresponding unsaturated hydrocarbons and halogenated derivatives thereof are included together with other derivatives of the above defined class of hydrocarbons. As mentioned, the straight-chain aliphatic hydrocarbons, as well as compounds of the type of cyclohexane, ethyl benzene, and the like, are compounds especially suitable as the starting material in the controlled oxidation reaction effected in accordance with the process of the present invention.

Generally speaking, the class of sensitizers to be employed as promoting agents in the hydrogen bromide catalyzed controlled oxidation of the organic compounds of the class defined hereinabove comprises compounds which produce unstable peroxides under the operating conditions employed. Compounds that are suitable as sensitizers in the process of the present invention and are believed to form unstable peroxides in situ during the oxidation reaction include 2-chlorpropene, isopropyl chloride, and the like chlorinated compounds.

The amount of the sensitizer to be employed will vary within relatively wide limits, although optimum amounts or percentages may be readily determined for each individual case. Generally speaking, the concentration of the sensitizer will vary from a small fraction of 1% e. g. about 0.1% or less, to about 4% or 5% or more, e. g. 10%, as calculated on the volume of the reactants introduced into the reaction zone. Satisfactory results have been obtained when the sensitizer concentration was in the neighborhood of about 1% by volume. The optimum amount of the sensitizer to be used will depend on a number of variables, such as the particular organic material treated, the hydrogen bromide concentration, the specific temperature employed, etc. The use of a given amount of the sensitizer in lieu of the same amount of hydrogen bromide will materially improve the yield of the desired oxygenated products. However, it is still necessary to use the hydrogen bromide which apparently acts as the catalyst. Therefore, an increase in the sensitizer concentration will permit the reduction in the hydrogen bromide concentration only to a certain minimum, which is apparently above the amount of hydrogen bromide which, under equilibrium conditions in the operating zone, reacts with the organic starting material to produce alkyl bromides. In order to obtain optimum yields, it is preferred to correlate the hydrogen bromide and sensitizer concentrations.

It was stated above that the slow or non-explosive controlled oxidation of the above-outlined class of organic compounds, when effected in the presence of hydrogen bromide, is realized at temperatures below those at which spontaneous combustion or substantial decomposition of the carbon structure occurs. It was also stated that the presence of the sensitizers, at least in some cases, permits the use of relatively lower reaction temperatures, while at the same time attaining the same or greater yields of the desired oxygenated products as compared with those obtained when the reaction is effected in the presence of hydrogen bromide but in the absence of the sensitizer. The upper temperature limit will depend on the specific organic substance to be oxidized, the proportions of the organic substances, oxygen, hydrogen bromide, and sensitizer present in the mixture subjected to the elevated temperatures. Generally, speaking, this upper temperature limit is in the neighborhood of about 225° C., although some of the more stable organic compounds of the defined class may be heated to even higher temperatures, e. g. about 250° C., particularly when the reaction is effected in the presence of relatively larger concentrations of the sensitizer and of inert diluents, such heating failing to cause the mixture to decompose to carbon and other undesirable products of decomposition. In this connection it must be noted that excessively high temperatures, even though they are below the explosive region, should be avoided because of certain undesirable side reactions, such as the reaction of the hydrogen bromide with the organic compounds and oxygen to form the corresponding organic bromides. Although the upper temperature limit was mentioned to be in the neighborhood of about 225° C., this temperature may be raised above this limit, particularly when shorter contact periods, relatively more stable compounds, and/or higher concentrations of the sensitizer are employed. On the other hand, some of the more readily oxidizable compounds may be economically oxidized according to the present process at lower temperatures, such as between about 150° C. and about 175° C., particularly when the reaction is effected with relatively larger percentages of the more active sensitizers, such as isopropyl chloride. Other conditions being equal, a further decrease in the operating temperature generally decreases the output of the product per unit of time, so that at temperatures materially below about 100° C. the controlled oxidation in the presence of hydrogen bromide and of the above-mentioned sensitizers may become uneconomical.

Although the volumentric ratios of the organic starting material to the oxygen may vary within relatively wide limits, satisfactory yields of the desired oxygenated product or products can be obtained by using equivolumentric quantities thereof. As to the amount of hydrogen bromide to be employed as the catalyst, this amount may also vary, although optimum amounts or percentages which may be readily determined for each case will depend on a number of variables. Thus, it has been stated that an increase in the concentration of the sensitizer in the reaction mixture, other conditions being equal, will permit a decrease in the hydrogen bromide concentration. When the reaction is effected in the presence of the sensitizers, the hydrogen bromide concentration may be considerably below the 20% which has been set in the previously mentioned patent applications as constituting the approximate upper limit.

The oxidation in accordance with the present process may be effected at atmospheric pressure, although higher or lower pressures may also be employed. Generally it is preferable to use superatmospheric pressures because more of the mixture subjected to treatment may be conveyed through a given unit of reaction space per unit of time.

The oxidation reaction may be effected in the liquid or vapor phase or in a two-phase liquid-vapor system. Since it is difficult to maintain a desirable relatively high oxygen concentration when the reaction is conducted in the liquid phase, it is generally preferable to effect the reaction in accordance with the process of the present invention in the vapor phase. Some of the higher-boiling organic compounds cannot be effectively maintained in the vapor state and in contact with sufficient concentrations of oxygen and hydrogen bromide without causing the spontaneous combustion of such a mixture. The oxidation of these organic compounds may be readily effected in the presence of an inert diluent or carrier such as steam, nitrogen, carbon dioxide and even methane, which latter is relatively stable at the temperatures at which the above-mentioned organic compounds may be oxidized in accordance with the process of the present invention.

The invention may be executed in a batch, intermittent or continuous manner. When operating in a continuous system, all of the organic compound, oxygen, hydrogen bromide and sensitizer, as well as the diluent if such is used, may be first mixed and the mixture thus formed may then be conveyed through the whole length of the reaction zone. In the alternative, it is possible to introduce at least a portion of the sensitizer, hydrogen bromide catalyst and/or one or both of the reactants, i. e. oxygen and the organic material subjected to oxidation, at various intermediate points along the reaction zone. Such operation may be frequently desirable to control the operating conditions in the reaction zone and also to increase the yield of the desired products. The contact time may vary within rather wide limits and at least in part depend on the type and amount of the various compounds conveyed through the reaction zone, as well as on the other operating conditions. Generally in a continuous system, it has been found that satisfactory yields of the desired carboxylic acids, organic peroxides and/or ketones (which latter term refers to organic compounds having one or more ketonic carbonyl groups) may be obtained with contact periods of between about 1 minute and about 3 minutes, although shorter or longer contact times may also be employed.

The following examples will illustrate the process of the present invention and the advantages and benefits derived from employing sensitizers for the hydrogen bromide catalyzed controlled oxidation of organic compounds. It is understood, however, that there is no intention to be limited by any details set forth in these examples.

Example I

The reactor consisted of a glass coil having an internal diameter of 25 mm. This coil had a volume of 2980 cc., and was immersed in an oil bath which permitted accurate control of the reaction temperature. A gaseous mixture consisting of 2 parts by volume of propane, 2 parts by volume of oxygen and 1 part by volume of hydrogen bromide was conveyed through the reactor. The residence time was about 3 minutes, the reaction temperature being maintained at about 184° C. It was found that under these conditions about 58% of the introduced oxygen reacted to form oxygenated products.

Example II

The run described in Example I was repeated except for the fact that the reaction temperature was maintained at about 164° C., and that isopropyl chloride vapors, in an amount equal to about 2½% by volume of all of the vapors passing through the reactor, were substituted for an equal amount of propane. It was found that the addition of the sensitizer increased the consumption of oxygen to about 76%, in spite of the fact that the operating temperature was about 20° C. lower than that employed in the run in which no sensitizer was employed. It must be noted that substantially no oxidation of propane occurs when the above-mentioned reaction is attempted at a temperature of 164° C. in the presence of hydrogen bromide but in the absence of a sensitizer.

Example III

A series of runs was effected in the above-described reactor. In all of these runs propane and oxygen were introduced into the reactor at rates of 465 cc. per minute and 480 cc. per minute respectively. The contact time varied between about 1.5 and 1.8 minutes, the temperature in all of the runs being maintained at 189° C. The hydrogen bromide was employed in varying amounts some of the runs being effected without the addition of any sensitizer while others were conducted in the presence of different sensitizers of the class defined above. The conditions employed and the oxygen consumptions obtained are set forth in the following table:

| Sensitizer | Per Cent Oxygen Consumption at Following HBr Flows | | | |
|---|---|---|---|---|
| | 51 cc./min. | 78 cc./min. | 120 cc./min. | 204 cc./min. |
| None | 8.1 | 12.1 | 14.4 | 26.3 |
| 15 cc./mm. of isopropyl chloride | 10.6 | 13.7 | 25.4 | |
| 15 cc./min. of 2-chloropropene | 12.7 | 16.1 | 26.2 | 62.5 |

An analysis of the above results clearly indicates that increased oxygen consumption is obtained when the above-defined sensitizing agents are added to a mixture containing a fixed amount of hydrogen bromide. Also, the results show that considerably lower amounts of catalyst may be used to attain a given oxygen consumption when a sensitizer is added to the reaction mixture. For instance, the addition of even minor amounts of isopropyl chloride results in the same oxygen consumption with half the hydrogen bromide necessary for the oxidation in the absence of this sensitizer.

We claim as our invention:

1. In a process for the controlled oxidation of propane by the action of oxygen in the presence of effective amounts of hydrogen bromide at temperatures of from about 100° C. to about 225° C., the improvement providing a more complete combination of oxygen and allowing the use of less hydrogen bromide which comprises, replacing from 0.1 to 10% of the hydrocarbon with 2-chloropropene.

2. In a process for the controlled oxidation of propane by the action of oxygen in the presence of effective amounts of hydrogen bromide at temperatures of from about 100° C. to about 225° C., the improvement providing a more complete combination of oxygen and allowing the use of less hydrogen bromide which comprises, replacing from 0.1 to 10% of the hydrocarbon with isopropyl chloride.

3. In a process for the controlled oxidation of alkanes by the action of oxygen in the presence of effective amounts of hydrogen bromide at temperatures of from about 100° C. to about 225° C., the improvement providing a more complete combination of oxygen and allowing the use of less hydrogen bromide which comprises, replacing from 0.1 to 10% of the hydrocarbon with a monochloride of a three carbon atom acylic hydrocarbon.

4. In a process for the controlled oxidation of cycloalkanes by the action of oxygen in the presence of effective amounts of hydrogen bromide at temperatures of from about 100° C. to about 225° C., the improvement providing a more complete combination of oxygen and allowing the use of less hydrogen bromide which comprises, replacing from 0.1 to 10% of the hydrocarbon with a monochloride of a three carbon atom acyclic hydrocarbon.

5. In a process for the controlled oxidation of aliphatic hydrocarbons by the action of oxygen in the presence of effective amounts of hydrogen bromide at temperatures of from about 100° C. to about 225° C., the improvement providing a more complete combination of oxygen and allowing the use of less hydrogen bromide which comprises, replacing from 0.1 to 10% of the hydrocarbon with a monochloride of a three carbon atom acylic hydrocarbon.

6. In a process for the controlled oxidation of aromatic hydrocarbons by the action of oxygen in the presence of effective amounts of hydrogen bromide at temperatures of from about 100° C. to about 225° C., the improvement providing a more complete combination of oxygen and allowing the use of less hydrogen bromide which comprises, replacing from 0.1 to 10% of the hydrocarbon with a monochloride of a three carbon atom acyclic hydrocarbon.

7. In a process for the controlled oxidation of hydrocarbons by the action of oxygen in the presence of effective amounts of hydrogen bromide at temperatures of from about 100° C. to about 225° C., the improvement providing a more complete combination of oxygen and allowing the use of less hydrogen bromide which comprises, replacing from 0.1 to 10% of the hydrocarbon with a monochloride of a three carbon atom acyclic hydrocarbon.

FREDERICK F. RUST.
    JOHN H. RALEY.
    WILLIAM E. VAUGHAN.

REFERENCES CITED

The following references are of record in the file of this patent:

UNITED STATES PATENTS

| Number | Name | Date |
| --- | --- | --- |
| 1,924,763 | Carpenter | Aug. 27, 1933 |
| 2,265,948 | Loder | Dec. 9, 1941 |
| 2,365,631 | Faith | Dec. 19, 1944 |
| 2,391,740 | Raley et al. | Dec. 25, 1945 |
| 2,421,392 | Rust et al. | June 3, 1947 |

OTHER REFERENCES

Gilman, "Organic Chem.," vol. I, pages 490–541 (1938). (Copy in Scientific Library.)

Certificate of Correction

Patent No. 2,480,971 — September 6, 1949

FREDERICK F. RUST ET AL.

It is hereby certified that errors appear in the printed specification of the above numbered patent requiring correction as follows:

Column 7, Example III, in the table, first column thereof, second line under the heading "Sensitizer", for "15 cc./mm." read *15 cc./min.*; column 8, line 41, and line 62, for "acylic" read *acyclic*;

and that the said Letters Patent should be read with these corrections therein that the same may conform to the record of the case in the Patent Office.

Signed and sealed this 7th day of February, A. D. 1950.

[SEAL]

THOMAS F. MURPHY,
*Assistant Commissioner of Patents.*